US008589783B2

(12) United States Patent
Williamson

(10) Patent No.: US 8,589,783 B2
(45) Date of Patent: Nov. 19, 2013

(54) SYSTEMS AND METHODS FOR PROCESSING COLOR INFORMATION IN SPREADSHEETS

(75) Inventor: Chris Williamson, Louisville, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 330 days.

(21) Appl. No.: 12/703,173

(22) Filed: Feb. 9, 2010

(65) Prior Publication Data

US 2011/0197117 A1    Aug. 11, 2011

(51) Int. Cl.
    G06F 17/00    (2006.01)
(52) U.S. Cl.
    USPC ........................................... 715/212; 715/234
(58) Field of Classification Search
    USPC .................................................. 715/212, 234
    See application file for complete search history.

(56) References Cited

U.S. PATENT DOCUMENTS

| | | | | | |
|---|---|---|---|---|---|
| 5,231,577 | A | * | 7/1993 | Koss .............................. | 715/210 |
| 5,598,519 | A | * | 1/1997 | Narayanan .................... | 715/219 |
| 5,926,185 | A | * | 7/1999 | Vyncke et al. ................. | 345/619 |
| 6,613,098 | B1 | * | 9/2003 | Sorge et al. .................... | 715/234 |
| 7,313,758 | B2 | | 12/2007 | Kozlov | |
| 2003/0146925 | A1 | * | 8/2003 | Zhao et al. ..................... | 345/700 |
| 2006/0050288 | A1 | * | 3/2006 | Aschenbrenner et al. ..... | 358/1.9 |
| 2006/0101293 | A1 | * | 5/2006 | Chandley et al. ............. | 713/300 |
| 2006/0136433 | A1 | | 6/2006 | Rothschiller et al. | |
| 2006/0146349 | A1 | * | 7/2006 | Romney ......................... | 358/1.9 |
| 2006/0224607 | A1 | * | 10/2006 | Tchaitchian et al. ......... | 707/101 |
| 2007/0022128 | A1 | | 1/2007 | Rothschiller et al. | |
| 2007/0101252 | A1 | * | 5/2007 | Chamberlain et al. ........ | 715/503 |
| 2008/0062192 | A1 | * | 3/2008 | Voliter et al. .................. | 345/591 |
| 2008/0198172 | A1 | * | 8/2008 | Chang ............................ | 345/593 |
| 2008/0300850 | A1 | * | 12/2008 | Chen et al. ....................... | 703/22 |
| 2009/0254808 | A1 | | 10/2009 | Yuan et al. | |
| 2010/0091322 | A1 | | 4/2010 | Kim | |
| 2011/0197118 | A1 | | 8/2011 | Williamson | |
| 2011/0205259 | A1 | * | 8/2011 | Hagood, IV ................... | 345/690 |

OTHER PUBLICATIONS

Office Open XML File Format-ECMA-376-1, Second Edition, 2008, P1-2500.*
Wimmer, "Automatic Feedback-Directed Object Inlining in the Java HotSpotTM Virtual Machine", VEE'07, Jun. 13-15, 2007, San Diego, California, USA, pp. 12-21.*
Office Open XML File Format-ECMA-376-1, Second Edition, 2008, pp. 1938-1962.*

(Continued)

Primary Examiner — Stephen Hong
Assistant Examiner — Ahamed I Nazar
(74) Attorney, Agent, or Firm — Finnegan, Henderson, Farabow, Garrett & Dunner, L.L.P.

(57) ABSTRACT

Methods to facilitate the processing of color information in spreadsheets described using markup languages are presented. In some embodiments, a method for storing color information for objects in a spreadsheet document described in a markup language may comprise obtaining distinct color values from a plurality of spreadsheet color table objects. The color values in the plurality of spreadsheet color table objects are referenced by spreadsheet objects through a plurality of indexes and each index corresponds to a distinct color table object. The distinct color values are stored in a color palette table object and are accessed using a color palette index. Index values in each of the plurality of color tables are mapped to the color palette index, if the index value and the color palette index value point to the same color value. The mapping permits objects to reference color values in the color palette object table.

20 Claims, 5 Drawing Sheets

(56) References Cited

OTHER PUBLICATIONS

ECMA-376-1, Information technology—Document description and processing languages—Office Open XML File Formats Part 1: Fundamentals and Markup Language Reference, Second Edition (2008).

Office Open XML, Ecma TC45, Final Draft, Part 1: Fundamentals, Oct. 2006.

Office Open XML, Part 3: Primer, Dec. 2006.

Office Action dated Jul. 19, 2011, in related U.S. Appl. No. 12/703,179, filed Feb. 9, 2010.

Office Action dated Mar. 13, 2012, in related U.S. Appl. No. 12/703,179, filed Feb. 9, 2010.

Wimmer, Christian et al., "Automatic Feedback-Directed Object Inlining in the Java HotSpot Virtual Machine," Jun. 13, 2007, *Association for Computing Machinery*.

Extended European Search Report issued in European Application No. 11153546.4 dated Mar. 26, 2012.

*ECMA International Technical Committee TC45:* "Office Open XML—ECMA TC45 Final Draft—Part 3: Primer," ECMA International, Oct. 6, 2006, retrieved from the internet: http://www.ecma-international.org/news/TC45_current_work/Office%20Open%20XML%20Part%203%20-%20Primer.pdf, downloaded Mar. 6, 2012, Section 3.7.

Korsgard, D. S., et al. "Dynamic Styling in Web Development," Aalborg University, Jun. 12, 2009: retrieved from the internet: URL:http://projekter.aau.dk/projekter/files/17697778/final.pdf: downloaded Mar. 7, 2012.

Notice of Allowance issued in U.S. Appl. No. 12/703,179 dated Sep. 26, 2012.

Extended European Search Report issued in European Patent Application No. 11153567.0 dated Apr. 2, 2013.

\* cited by examiner

SYSTEMS AND METHODS FOR PROCESSING COLOR INFORMATION IN SPREADSHEETS

BACKGROUND

1. Technical Field

The present disclosure pertains to the field of printing and in particular, to systems and methods for the processing of color information in spreadsheets described using markup languages.

2. Description of Related Art

Document processing software allows users to view, edit, process, store, and print various types of documents conveniently. Document content for printing can be described using a variety of ways, including through the use of markup languages such as Office Open eXtensible Markup Language ("OOXML"), or SpreadsheetML ("SML") which is based on XML and is typically used with spreadsheets. Markup languages permit the textual annotation of a document. Descriptive markup languages can be used to specify structural relationships between parts of the document but typically do not provide any instructions on how the document is to be rendered or presented to end users. On the other hand, procedural and presentational markup languages may include instructions that detail how the document content is to be rendered.

When a document described using a descriptive markup language is rendered, the structural relationships between document parts can complicate the process of determining the final renderable content for printing. In the case of documents such as spreadsheets, where the values of a spreadsheet cell may depend on a multiplicity of other cells, the complexity can be increased manifold. Spreadsheet elements such as cells, tables and their associated attributes are often represented programmatically as objects. Therefore, when spreadsheets specified in a markup language (such as OOXML or SML) are processed for printing, a multiplicity of spreadsheet objects may be loaded into memory and pointers to one or more objects (which reflect structural relationships between document parts) may be traversed multiple times in order to determine the appearance of rendered objects. For example, for SML, all data is typically loaded into memory before pagination determinations are made and rendering can start.

The loading of multiple objects into memory and the repeated pointer traversals during processing can contribute to the use of additional memory resources and other processing inefficiencies. For example, the use of additional memory can increase the cost of printers, while repeated pointer traversals during processing can contribute to lower throughput. In the context of spreadsheets, the processing of color data associated with spreadsheet objects can involve the use multiple memory resident color tables and contribute significantly to memory resource use and processing inefficiencies. Thus, there is a need for systems and methods that permit the efficient processing and printing of color data associated with spreadsheet objects while using memory resources in a more optimal manner.

SUMMARY

Consistent with disclosed embodiments, systems and methods for the processing of color information in spreadsheets described using markup languages are presented. In some embodiments, a method for storing color information for at least one object in a spreadsheet document described in a markup language comprises: obtaining distinct color values from a plurality of spreadsheet color table objects, wherein color values in the plurality of spreadsheet color table objects are referenced by the object by using a plurality of indexes, and wherein each index in the plurality of indexes corresponds to a distinct color table object. The distinct color values are stored in a color palette table object, wherein the color values in the color palette table object are accessed using a color palette index, and an index value in each of the plurality of color tables is mapped to a color palette index value, if the index value and the color palette index value point to the same color value.

Embodiments disclosed also relate to methods created, stored, accessed, or modified by processors using computer-readable media or computer-readable memory.

These and other embodiments are further explained below with respect to the following figures.

DETAILED DESCRIPTION

In accordance with embodiments reflecting various features of disclosed embodiments, systems and methods for the processing of color information in spreadsheets described using markup languages are presented. In some embodiments, printable spreadsheet data may take the form of a markup language description. For instance, examples related to the processing of spreadsheets markup language data are described in terms of OOXML or SML. However, the systems and methods described may be applied to spreadsheets described using other markup languages with appropriate modifications as would be apparent to one of ordinary skill in the art.

Figure 1:
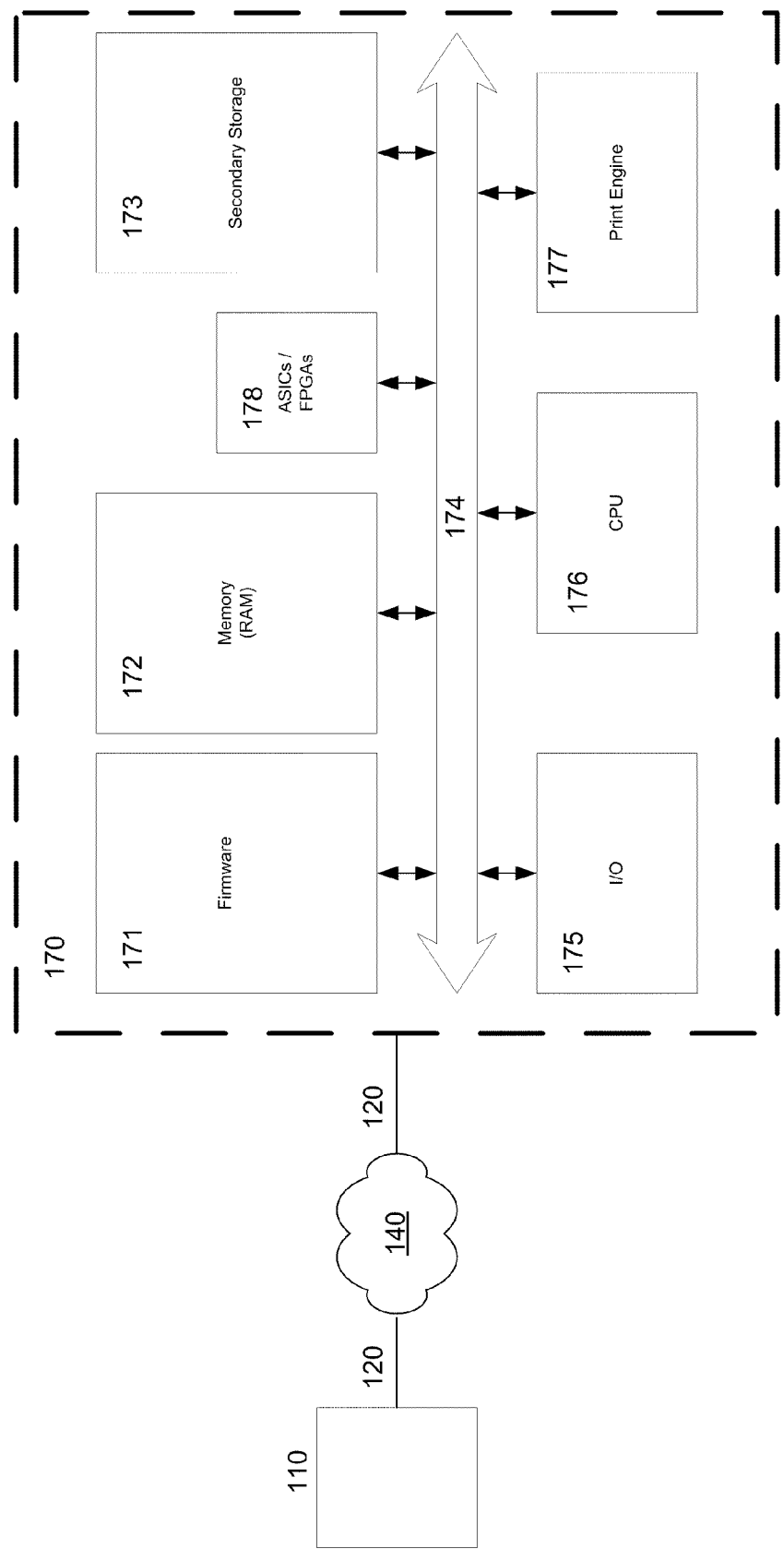
FIG. 1 shows a high-level block diagram of an exemplary computer coupled to an exemplary printer capable of executing an application for the processing of color information in spreadsheets described using markup languages.

FIG. 1 shows a high-level block diagram of an exemplary computer coupled to an exemplary printer capable of executing an application for the processing of color information in spreadsheets described using markup languages. In some embodiments, the techniques described may involve the use of cached color palettes that include information present in various spreadsheet color objects. In general, a computer software application consistent with disclosed embodiments may be deployed on a network of computers, printers, and other peripheral devices that are connected through communication links that allow information to be exchanged using conventional communication protocols and/or data port interfaces.

As shown in FIG. 1, exemplary system 100 includes computing device 110, which communicates with printer 170 over network 140 using connections 120. Computing device 110 may be a computer workstation, desktop computer, laptop computer, or any other computing device capable of being used in a networked environment. Computing device 110 may be capable of executing software (not shown) that allows the printing of documents, including documents such as spreadsheets or worksheets described using markup languages such as OOXML or SML using printers 170.

Exemplary printer 170 includes devices that produce physical documents from electronic data including, but not limited to, laser printers, ink-jet printers, LED printers. Exemplary printer 170 may take the form of a plotter, facsimile machine, multi-function device, digital copier, etc. In some embodiments, printer 170 may also be capable of directly printing documents received from computing device 110. In some embodiments, such an arrangement may allow for the direct printing of documents, with (or without) additional processing by computing device 110.

In some embodiments, documents may be described using a markup language and may contain one or more of text, graphics, images, and color information. In some embodiments, the documents may take the form of a spreadsheet described using OOXML or SML. In some embodiments, printer 170 may receive the OOXML or SML descriptions of documents for printing. Note, too, that document print processing can be distributed. Thus, computing device 110 and/or printer 170 may perform portions of document print processing such as markup language parsing, color information processing, pre-processing, typesetting, rasterization, half-toning, color matching, and/or other manipulation processes before a document is physically printed by printer 170.

Computing device 110 may also contain removable media drives (not shown), which may include, for example, 3.5 inch floppy drives, CD-ROM drives, DVD ROM drives, CD±RW or DVD±RW drives, USB flash drives, and/or any other removable media drives consistent with disclosed embodiments. In some embodiments, portions of a software application for the processing of color information in spreadsheets described using markup languages may reside on removable media and be read and executed by computing device 110 using the removable media drive.

Connection 120 couples computing device 110 and printer 170 over network 140 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. The communication links could be wireless links or wired links or any combination consistent with disclosed embodiments that allows communication between the various devices.

Network 140 could include a Local Area Network (LAN), a Wide Area Network (WAN), or the Internet. Printer 170 may be connected to network 140 through connection 120. In some embodiments, printer 170 may also be connected directly to computing device 110. System 100 may also include other peripheral devices (not shown), according to some embodiments. A computer software application for the processing of color information in spreadsheets described using markup languages consistent with the disclosed embodiments may be deployed on computer 110 and/or printer 170. For example, computing device 110 could execute some portions of software for the processing of color information in spreadsheets described using markup languages, while other portions may be executed by printer 170 in accordance with disclosed embodiments.

In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to render printable spreadsheet data specified in a markup language using color information processed in a manner consistent with disclosed embodiments. In some embodiments, printer 170 may also be able to access secondary storage or other memory in computing device 110 using I/O ports 175 and connection 120. In some embodiments, printer 170 may also be capable of executing software including a printer operating system, markup language parsing software, rasterization routines, and other appropriate application software.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as, but not limited to, SDRAM, or RDRAM. Firmware 171 may hold instructions and data including but not limited to a boot-up sequence and pre-defined routines for markup language parsing, language processing, rasterization, and half-toning, as well as other code. In some embodiments, code and data in firmware 171 may be copied to memory 172 prior to being acted upon by CPU 176.

Routines in firmware 171 may include code to process and print documents such as spreadsheets described using markup languages such as OOXML or SML, which may be received from computing device 110. In some embodiments, such processing may include the processing of color information in spreadsheets described using markup languages. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. FPGAs/ASICs 178 may also implement one or more of translation, compression, and rasterization algorithms.

In one embodiment, computing device 110 may send printable data in a document, such as a spreadsheet specified using a markup language to printer 170. Then, printer 170 may invoke routines to parse the markup language description and process color information. For example, color information objects may be identified and processed in a manner consistent with described implementations.

In some embodiments, the translation process from a markup language description of a document to the final printable data may include the generation of intermediate printable data comprising of display lists, which may aid in the generation of final printable data. In some embodiments, display lists may be stored in memory 172 or secondary storage 173. Exemplary secondary storage 173 may be an internal or external hard disk, memory stick, or any other memory storage device capable of being used in printer 170. In some embodiments, the display list may reside on one or more of printer 170 and/or computing device 110.

Figure 2:
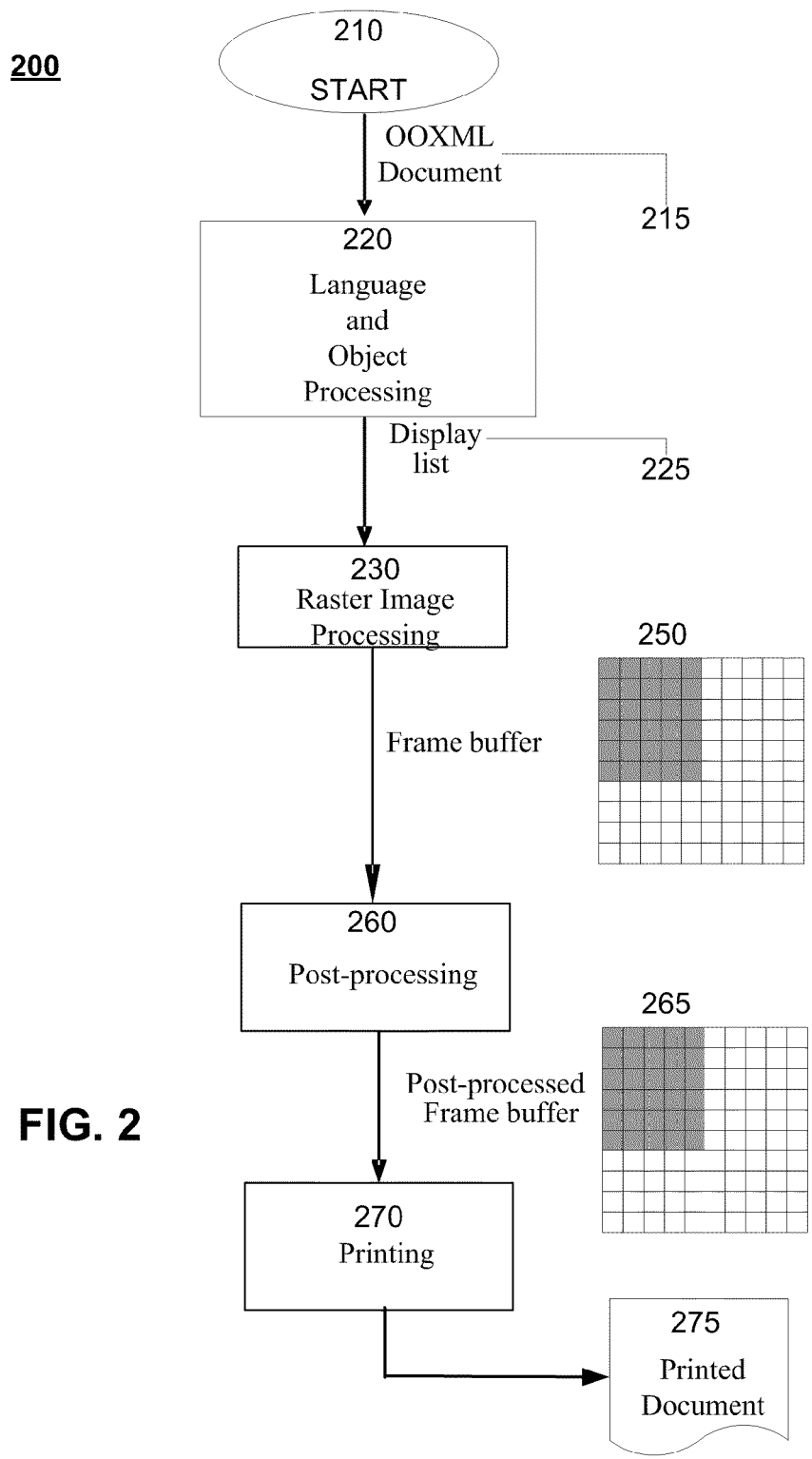
FIG. 2 shows exemplary process flow illustrating steps in a method for executing portions of an application to render printable data specified in a markup language.

FIG. 2 shows exemplary process flow 200 illustrating steps in a method for executing portions of an application to render printable data specified in a markup language. The process may start in step 210 with the initiation of a print job, which, in some instances, may be a spreadsheet specified in a markup language such as OOXML or SML.

In step 220, the document 215 can also be subjected to language and object processing. For example, data in the document may be parsed by an OOXML parser to identify individual objects, which may include color information objects in a spreadsheet document, as well as text, image, and graphics objects. In some embodiments, language processing and object pre-processing may be performed by a markup language parser such as an OOXML parser and other associated routines. For spreadsheets, parsing may also be used to identify and process various objects specific to the spreadsheet such as cells, tables, shapes, styles and color information. The parser may also process spreadsheet color information data objects associated with spreadsheet fonts, cells, and tables to permit efficient printing in a manner consistent with embodiments described herein.

These operations may result in the placement of one or more primitives that describe entries in display list 225. Exemplary display list 225 may be an intermediate step in the processing of data prior to actual printing and may be parsed further before conversion into a subsequent form. Display list 225 may include such information as color, opacity, style, boundary information, and depth.

The conversion process from a display list representation to a form suitable for printing on physical media may be referred to as rasterizing the data or rasterization. In some embodiments, rasterization may be performed by a Raster Image Processor in step 230. For example, basic rasterization may be accomplished by taking a three dimensional scene, typically described using polygons, and rendering the three dimensional scene onto a two dimensional surface. Polygons can be represented as collections of triangles. A triangle may be represented by three vertices in the three dimensional space. A vertex defines a point, an endpoint of an edge, or a corner of a polygon where two edges meet. Thus, basic rasterization may transform a stream of vertices into corresponding two dimensional points and fill in the transformed two dimensional triangles. Upon rasterization, the rasterized data may be stored in a frame buffer, such as exemplary frame buffer 250, which may be physically located in memory 172.

In step 230, Raster Image Processing (RIP) module may process display list 225 and generate a rasterized equivalent in frame buffer 250. In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 350 may hold a representation of print objects in a form suitable for printing on a print medium by print engine 177.

In some embodiments, data in frame buffer 250 may be subjected to post-processing in step 260. For example, various operations such as half-toning, trapping, etc may be carried out on the data in frame buffer 250. As a consequence of these operations, the data in frame buffer is altered resulting in post-processed frame buffer 265. Post-processed frame buffer 265 may then be subjected to any additional processing in step 270. For example, print engine 177, may process the rasterized post-processed data in post processed frame buffer 265, and form a printable image of the page on a print medium, such as paper.

Figure 3:
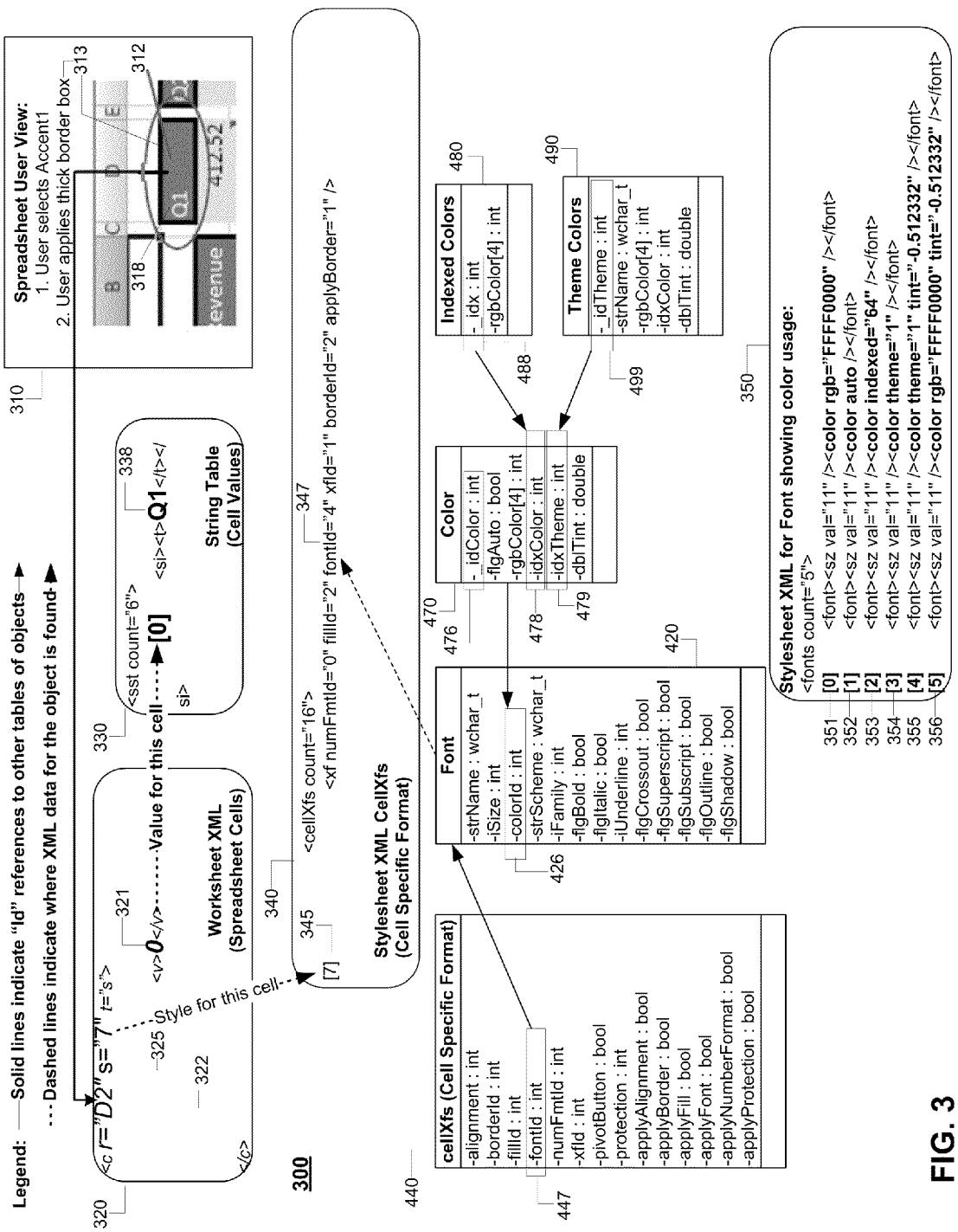
FIG. 3 shows a conventional exemplary OOXML cell-format specification and object mapping for a spreadsheet cell showing color information objects.

FIG. 3 shows a conventional exemplary OOXML cell-format specification and object mapping for a spreadsheet cell showing color information objects. As shown in FIG. 3, exemplary spreadsheet 310 includes cell 312 identified by its location "D2" (column D row 2 of spreadsheet), with spreadsheet cell data 318 given by the string "Q1". A cell can be specified by its location at the intersection of a row and column. Cells may hold data and have a number of characteristics, such as numeric or text formatting, alignment, font, color, fill, and border. As shown in FIG. 3, spreadsheet cell 312 has data 318 given by "Q1".

Cell 312 itself may be expressed by the "c" collection in Worksheet XML description 320, which indicates that the cell reference 322 is "D2". Exemplary cell 312 can also indicate style identifier 325 (attribute "s") with value s="7" and a data type (attribute t), which indicates that cell 312 holds data of "string" type indicated by t="s". To determine whether cell value attribute <v> 321 is a number or an index to a string, the cell's data type can be examined. When the cell data type indicates string, then it is an index and not a numeric value. As shown in FIG. 3, cell value index 321 is an index into zero-based index shared string table 330 and indicates the location of the contents of cell 312. Cell value index 321 has the value "0" indicating that it is the first entry in the shared string table 330, which maps to cell data 338 shown as "Q1".

Styles may be applied to objects in a spreadsheet. Cells, Tables, Cell ranges, PivotTables, Charts, and Shapes may be formatted using Styles, Themes, and Direct Formatting. A Style may be viewed as a named collection of formatting elements. A Style may specify color, font, and shape effects directly, or these elements can be referenced indirectly by referring to a Theme definition. Themes define a set of colors, font information, and effects on shapes. If a style or formatting element defines its color, font, or effect by referencing a theme, then picking a new theme can cause the switching of all colors, fonts, and effects for that formatting element.

As shown in FIG. 3, the cell 312 in spreadsheet 310 uses named style 325 referenced in Worksheet XML 320. The attribute value of named style 325 s="7" referenced in Worksheet XML 320 indicates that the eighth (or zero-based $7^{th}$) <xf> definition 345 of CellXfs or Cell Specific Format 340 holds the direct cell specific formatting information for cell 312 as shown by the dashed line from named style 325 to the eighth <xf> definition 345 in CellXfs. The cell style record (<xf>) ties together all the cell-specific formatting (e.g. number format, font information, borders, and fill) for a cell's direct formatting. CellXfs or Cell Specific Format 340 specifies the direct formatting elements for cell 312. CellXfs 340 also shows that attribute value fontId 347 is 4.

As shown in FIG. 3, cellXfs object 440 holds cell specific formatting information, including values for cell specific format attributes. The cellXfs object 440 holds a value for fontId 447. The value of fontId 447 indicates the (zero-based) record number in Font table object 420 that holds font properties shown by the solid line from fontId 447 to Font table object 420. In addition, cellXfs object 440 also holds values for attributes fillId and borderId. These attribute values are also indexes to records the fill and border object tables (not shown), respectively.

Font table object 420 holds records related to the properties for the various fonts used in a workbook. A workbook may be a collection of one or more spreadsheets. The value of attribute fontId 447 may be used as an index (zero-based) to obtain a record that lists font properties corresponding to the value of fontId. A record in Font table object 420 may also specify a color for the font using index colorId 426, which can be a zero-based index to records in Color table object 470.

As shown in Font XML Style Sheet 350, font colors may be specified in various ways. For example, a Red-Green-Blue ("RGB") value for a custom color—"color rgb="FFFF0000"—may be specified as shown by font collection 351. Colors may also be specified as auto, as in font collection 352, where a font color is automatically applied based on the background color.

In addition, font colors may be expressed as an index value to a legacy indexing scheme for colors—as indicated by the statement "color indexed="64"—shown in font collection 353. When an index value is used, the attribute idxColor 478 is used to look up an rgb color value in Indexed Colors table object 480. Indexed Colors table object 480 contains a sequence of RGB color values that may be looked up using color index idx 488. Further, colors may also be specified using theme index. For example, as shown in Font collection 354, a color theme may be specified by the statement—"color theme="1"—where "1" is the value of the index. When a theme index value is used, the attribute _idTheme 479 is used to look up an rgb color value in Theme Colors table object 490. Theme Colors table object 480 contains a sequence of RGB color values that may be looked up using theme index _idTheme 499. Note that Theme Colors table object records may further reference colors in Indexed Colors object table 480. Further, as shown in Font collections 355 and 356, a tint may be applied to theme color or a custom color. When a tint is applied to a color, the color value may change.

As evident from the description above, in conventional methods for processing spreadsheet objects, the various references to objects described are traversed multiple times during printing causing inefficiencies. For example, for SML and various other OOXML descriptions, all data is typically loaded into memory before pagination determinations are made and rendering can start. Thus, all of the tables may need to be maintained in memory. Moreover, for each cell being printed color attribute values in a multiplicity of tables are looked up and resolved in order to determine the final print attributes, which are used to render the cell. For example, during conventional processing, when a cell is processed for rendering, color attribute values for fills, fonts, and borders are looked up using color table object 470, Indexed Colors object 480, and Theme Color object 490. Because the lookups occur continually as each cell and cell object in the spreadsheet is processed, multiple tables are stored in memory during printing and these tables are looked up several times leading to both increased memory usage and processing inefficiencies.

Figure 4:
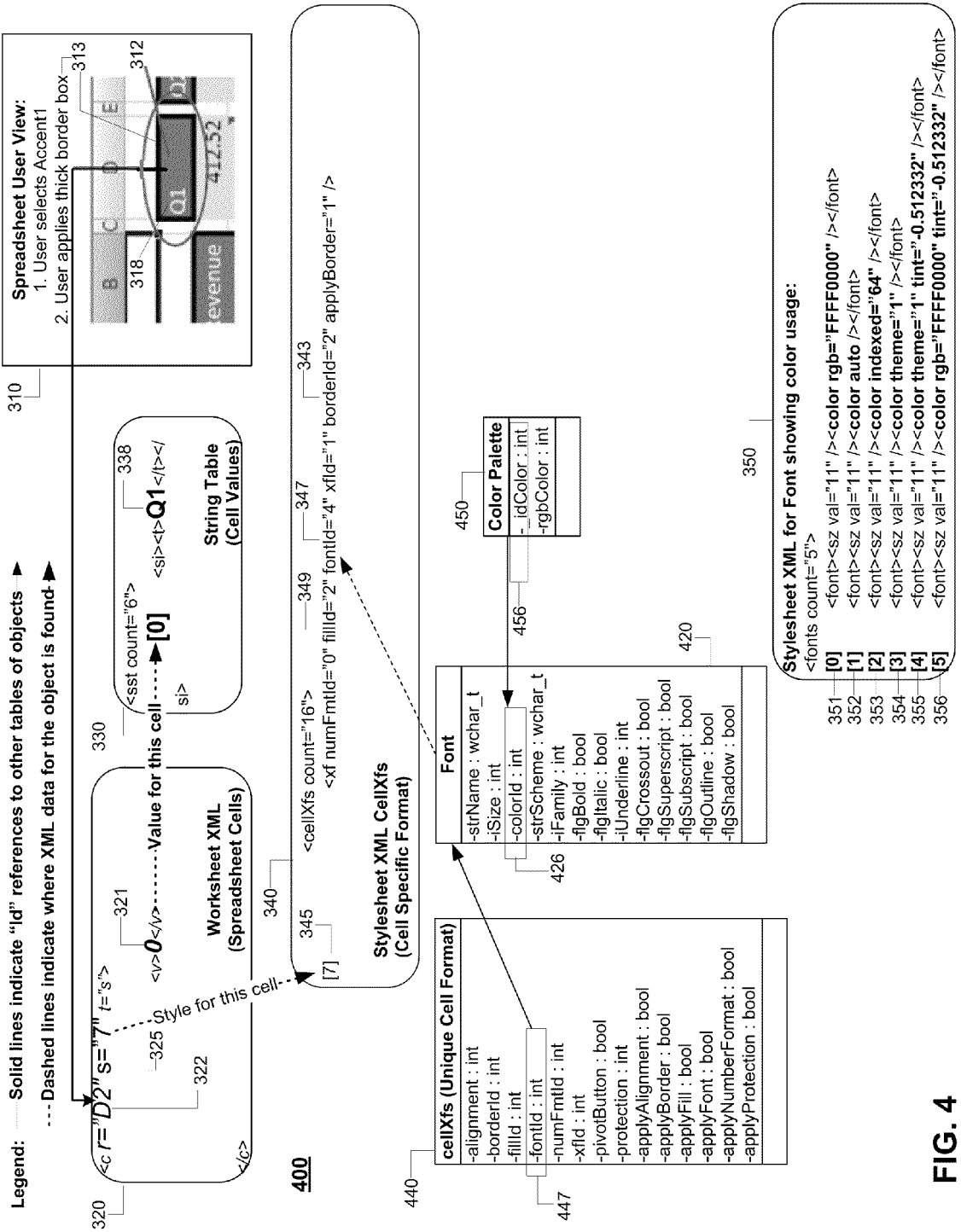
FIG. 4 shows an exemplary object mapping for an OOXML spreadsheet cell resulting from a method of processing color information in spreadsheets described using OOXML in a manner consistent with disclosed embodiments.

FIG. 4 shows an exemplary object mapping 400 for an OOXML spreadsheet cell resulting from a method of processing color information in spreadsheets described using OOXML in a manner consistent with disclosed embodiments. In some embodiments, color values in Indexed Colors table object 480 and Theme Colors 490 may be placed in records in Color Palette table object 450. In addition, custom color values and color values to which a tint is applied may also be stored in Color Palette table object 450.

In some embodiments, a mapping may be established that allows determination of idColor index 456 (for Color Palette table object 450) from any of idColor index 476 (for Color table object 470), idx index 488 (for Indexed Colors table object 480), and idTheme index 499 (for Theme Colors table object 490). Consequently, color indexes associated with spreadsheet objects such as fonts, borders, fills etc. may be used to determine colorId index 456, which identifies a record in Color Palette table object 450 that holds the color value.

In some embodiments, records in Color Palette table object 450 may hold color values in RGB and/or in Cyan Magenta Yellow and black ("CMYK"). In some embodiments, color space conversion routines may be used to convert color values from RGB to CMYK or vice versa. In some embodiments, Color Palette table object 450 may be cached in memory sand take the form of a cached array or cached color palette.

In some embodiments, exemplary object mapping 400 may be created during language and object processing step 220 for OOXML spreadsheet document 215. For example, exemplary object mapping 400 may be created by a parser when processing color attributes of spreadsheet objects in a spreadsheet described using OOXML or SML. In some embodiments, exemplary object mapping 400 may be used during raster image processing step 230 to render spreadsheet objects that use styles.

Figure 5:
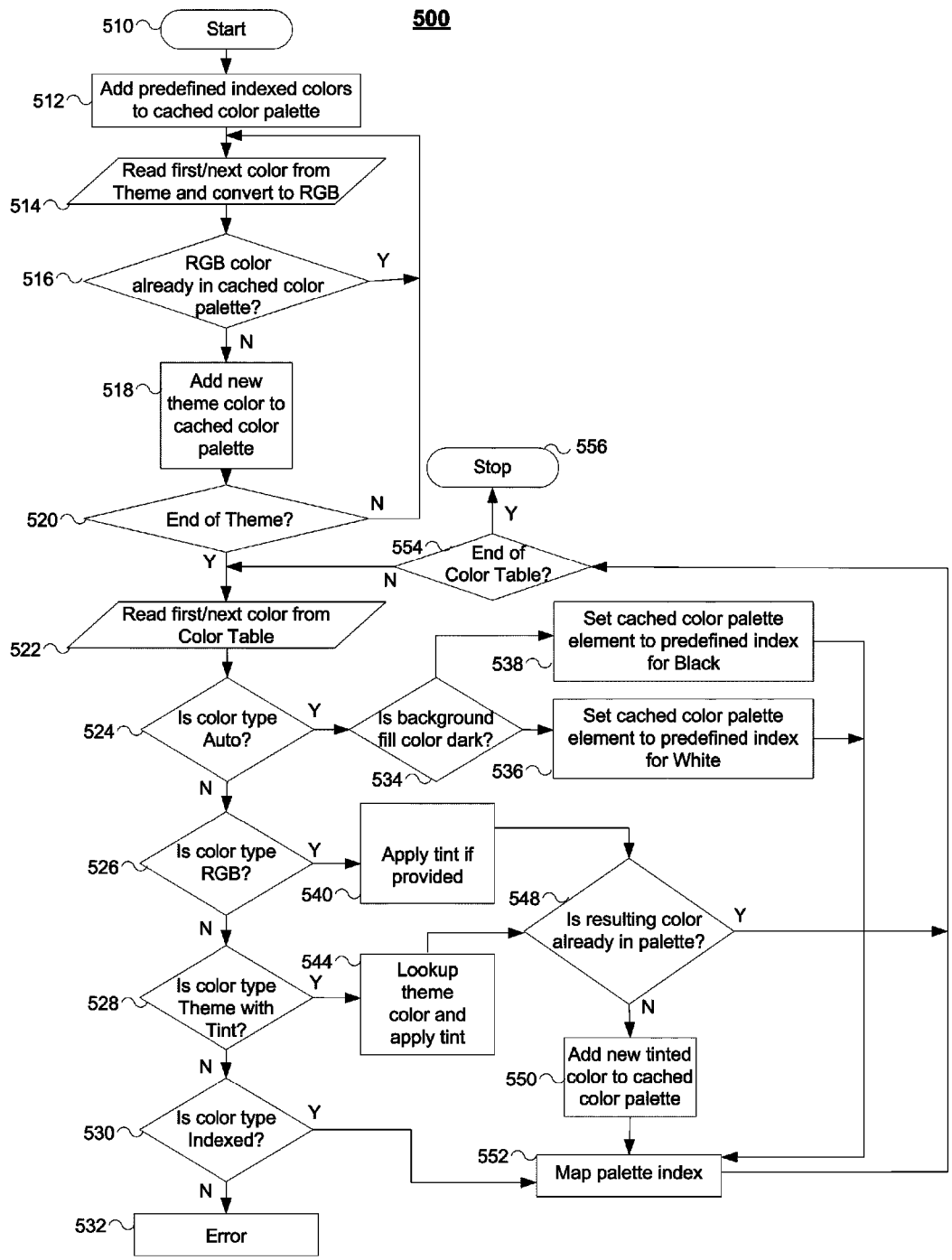
FIG. 5 shows a flowchart for an exemplary method for processing color information in spreadsheets described using OOXML in a manner consistent with disclosed embodiments.

FIG. 5 shows a flowchart for an exemplary method 500 for processing color information in spreadsheets described using OOXML in a manner consistent with disclosed embodiments. In some embodiments, method 500 may be performed by an OOXML parser. In some embodiments, method 500 may be performed on a spreadsheet described in a markup language such as OOXML or SML. The method commences in step 510. Next, in step 512, predefined indexed colors may be added to Color Palette table object 450. In some embodiments, the colors may be added from Indexed Colors table object 480.

In step 514, the first or next color may be read from Theme Color table object 490 and converted to RGB. In step 516, the theme color RGB value may be compared with color values of records in Color Palette table object 450. If the RGB value for the theme color is already in Color Palette table object 450 ("Y" in step 516), then the algorithm returns to step 514 to begin another iteration. If the RGB value for the theme color is not in Color Palette table object 450 ("N" in step 516), then, in step 518, the theme color may be added to a record in the cached color palette. If there are no more records in Theme Color table object 490 ("Y" in step 520) then, the algorithm proceed to step 522, otherwise ("N" in step 520) the algorithm returns to step 514 to begin another iteration.

In step 522, the first or next record in Color table object 470 may be read. If the color type is "Auto" ("Y" in step 524), then in step 534, the background fill color may be checked. If the background fill color is dark ("Y" in step 534) then, in step 538, the color value of the record in Color Palette table object 450 may be set to the predefined index for White and the algorithm proceeds to step 552. If the background fill color is not dark ("N" in step 534) then, in step 536, the color value of the record in Color Palette table object 450 may be set to the predefined index for Black and the algorithm proceeds to step 552.

If the color type is not "Auto" ("N" in step 524), then in step 526, the color type is checked to determine if the color type is RGB. If the color type is RGB ("Y" in step 526), then, in step 540, any tint that is provided may be applied to the RGB value and the algorithm proceeds to step 548.

If the color type is not RGB ("N" in step 526), then, in step 528, the color type may be checked to determine if the color type is Themed with a tint. If the color type is "Theme" with a tint ("Y" in step 528), then, in step 544, the theme color may be looked up and any tint that is provided may be applied to the color value. The algorithm can then proceed to step 548.

In step 548, the color resulting from application of the tint to the RGB value (obtained in step 540) or Themed color value (obtained in step 544) may be compared with colors already in Color Palette table object 450. If the color resulting from application of the tint is not in Color Palette table object 450 ("N" in step 548), then, in step 550, the new tinted color may be added to Color Palette table object 450 and the algorithm proceeds to step 552.

If the color type is not Themed with a tint ("N" in step 528), then, in step 530, the color type may be checked to determine if the color type is indexed. If the color type is not indexed ("N" in step 530), then, in step 532, the algorithm may indicates that there is an error in the markup language specification. If the color type is indexed ("Y" in step 528), then, the algorithm proceed to step 552.

In step 552, a mapping may be established between colors represented by the palette index and indexes for the indexed colors, themed colors, and the color table. The mapping may be used to determine the index for a Color Palette table object record corresponding to the index for an indexed color, a themed color, or a color in the color table. Accordingly, the palette index mapping may be used to determine the index idColor 456 for a record in Color Palette table object when presented with an indexed color index 488, theme color index 499, or color table index idColor 476. The algorithm then proceeds to step 554.

In step 554, if there are no more records in Color table object 470 ("Y" in step 554), then the algorithm may terminate in step 556. If there are additional records in Color table object 470 ("N" in step 554), then the algorithm proceeds to step 522 to begin another iteration.

It should be noted that although RGB values have been used in exemplary method 500 to represent color values, the color values may also be represented using various other color spaces such as CMYK. Accordingly, in some embodiments, exemplary algorithm 500 may perform color space conversions of color values from the input color space (e.g. RGB) to the output color space (e.g. CMYK) and store the color value in the output color space. In some embodiments, method 500 may store color values in both the input and output color space. In some embodiments, after creating and populating Color Palette table object 450, Color table object 470, Indexed Colors table object 480, and Theme Colors table object 490 may be deleted thereby freeing up memory resources.

Other implementations will be apparent to those skilled in the art from consideration of the specification and practice of disclosed embodiments. It is intended that the specification and examples be considered as exemplary only, with its true scope and spirit being indicated by the following claims.

What is claimed is:

1. A processor implemented method for generating color information for at least one object in a spreadsheet document described in a markup language, the method comprising:
   parsing the spreadsheet document to generate at least one display list associated with the at least one object by:
   obtaining distinct color values from a plurality of spreadsheet color table objects, wherein color values in the plurality of spreadsheet color table objects are referenced by the at least one object in the spreadsheet by using a plurality of indexes of the color table objects;
   storing the distinct color values in a color palette table object, wherein color values in the color palette table object are accessed using a plurality of color palette indexes; and
   generating a mapping between each index in each of the plurality of color table objects and one of the plurality of color palette indexes that points to a same color value; and
   rasterizing the at least one object in a frame buffer by processing the display list using the mapping generated during parsing.

2. The processor implemented method of claim 1, wherein the spreadsheet document is described in OOXML.

3. The processor implemented method of claim 1, wherein the spreadsheet document is described in SML.

4. The processor implemented method of claim 1, wherein the method is performed by a parser and a rasterizer.

5. The processor implemented method of claim 1, further comprising deleting the plurality of color table objects from a memory coupled to the processor after storing the color palette table object and the index mapping.

6. The processor implemented method of claim 1, wherein the color palette table object is cached in a memory coupled to the processor.

7. The processor-implemented method of claim 1, wherein the at least one object includes at least one of a border object, a font object, or a fill object.

8. The processor implemented method of claim 1, wherein the method is performed on:
   a computer;
   a printer; or
   a printer coupled to a computer.

9. The processor implemented method of claim 1, wherein the plurality of color table objects comprise at least one of an indexed color table. object, a theme color object, and a color table object.

10. The processor implemented method of claim 1, wherein storing the distinct color values in a color palette table object further comprises:
    performing a color space conversion of the distinct color values to an output color space to obtain color values in the output color space, wherein the output color space is different from the color space in which the color values are specified; and
    storing the color values in the output color space in the color palette table.

11. A non-transitory computer-readable medium that stores instructions, which when executed by a processor, causes the processor to generate color information for at least one object in a spreadsheet document described in a markup language, by:
    parsing the spreadsheet document to generate at least one display list associated with the at least one object by:
    obtaining distinct color values from a plurality of spreadsheet color table objects, wherein color values in the plurality of spreadsheet color table objects are referenced by the at least one object in the spreadsheet by using a plurality of indexes of the color table objects;
    storing the distinct color values in a color palette table object, wherein color values in the color palette table object are accessed using a plurality of color palette indexes; and
    generating a mapping between each index in each of the plurality of color table objects and one of the plurality of color palette indexes that points to a same color value; and
    rasterizing the at least one object in a frame buffer by processing the display list using the mapping generated during parsing.

12. The computer readable medium of claim 11, wherein the spreadsheet document is described in OOXML.

13. The computer readable medium of claim 11, wherein the spreadsheet document is described in SML.

14. The computer readable medium of claim 11~wherein the method is performed by a parser and a rasterizer.

15. The computer readable medium of claim 11, further comprising deleting the plurality of color table objects from a memory coupled to the processor after storing the color palette table object and the index mapping.

16. The computer readable medium of claim 11, wherein the color palette table object is cached in a memory.

17. The computer readable medium of claim 11, wherein the at least one object includes at least one of a border object, a font object, or a fill object.

18. The computer readable medium of claim 11, wherein the method is performed on:
    a computer;
    a printer; or
    a printer coupled to a computer.

19. The computer readable medium of claim 11, wherein storing the distinct color values in a color palette table object further comprises:
  performing a color space conversion of the distinct color values to an output color space to obtain color values in the output color space, wherein the output color space is different from the color space in which the color values are specified; and
  storing the color values in the output color space in the color palette table.

20. A computer-readable memory that stores instructions, which when executed by a processor, causes the processor to generate color information for at least one object in a spreadsheet document described in a markup language, by:
  parsing the spreadsheet document to generate at least one display list associated with the at least one object by:
    obtaining distinct color values from a plurality of spreadsheet color table objects, wherein color values in the plurality of spreadsheet color table objects are referenced by the at least one object in the spreadsheet by using a plurality of indexes of the color table objects;
    storing the distinct color values in a color palette table object, wherein color values in the color palette table object are accessed using a plurality of color palette indexes; and
    generating a mapping between each index in each of the plurality of color table objects and one of the plurality of color palette indexes that points to a same color value; and
  rasterizing the at least one object in a frame buffer by processing the display list using the mapping generated during parsing.

* * * * *